(12) United States Patent
McEvoy

(10) Patent No.: US 6,869,046 B2
(45) Date of Patent: Mar. 22, 2005

(54) AIRCRAFT PROPULSIVE POWER UNIT

(75) Inventor: Finbarr McEvoy, County down (GB)

(73) Assignee: Short Brothers PLC, Belfast (GB)

( * ) Notice: Subject to any disclaimer, the term of this patent is extended or adjusted under 35 U.S.C. 154(b) by 0 days.

(21) Appl. No.: 10/261,832

(22) Filed: Sep. 30, 2002

(65) Prior Publication Data

US 2003/0102405 A1 Jun. 5, 2003

(30) Foreign Application Priority Data

Oct. 11, 2001 (GB) .............................................. 0124446

(51) Int. Cl.⁷ .............................................. B64D 27/00
(52) U.S. Cl. ................. 244/54; 244/110 B; 244/129.4; 239/265.19; 60/226.2
(58) Field of Search .............................. 244/110 B, 55, 244/53 R, 118.3, 129.4, 129.5; 60/226.2, 230; 239/265.29, 265.19; 49/109, 114, 119

(56) References Cited

U.S. PATENT DOCUMENTS

| | | | | | |
|---|---|---|---|---|---|
| 4,543,783 A | * | 10/1985 | Greune et al. | ............. | 60/226.2 |
| 4,585,189 A | * | 4/1986 | Buxton | ........................ | 244/54 |
| 4,860,956 A | * | 8/1989 | Fage | ..................... | 239/265.19 |
| 4,976,396 A | * | 12/1990 | Carlson et al. | ............... | 244/55 |
| 5,310,117 A | * | 5/1994 | Fage et al. | ............. | 239/265.29 |
| 5,615,834 A | * | 4/1997 | Osman | ................... | 239/265.19 |
| 5,775,639 A | * | 7/1998 | Fage | ...................... | 244/110 B |
| 6,487,845 B1 | * | 12/2002 | Modglin et al. | ........... | 60/226.2 |

FOREIGN PATENT DOCUMENTS

| | | | | | |
|---|---|---|---|---|---|
| GB | | 1111566 | * | 5/1968 | ........... B64D/33/00 |

* cited by examiner

*Primary Examiner*—Michael J. Carone
*Assistant Examiner*—Gabriel S. Sukman
(74) *Attorney, Agent, or Firm*—Fulbright & Jaworski L.L.P.

(57) ABSTRACT

An aircraft having a propulsive power unit supported in a fuselage mounted configuration and including an engine and a nacelle structure housing the engine. The nacelle structure is provided with upper and lower displaceable nacelle portions, such as thrust reverser cowls and fan cowl doors which are displaceable between closed dispositions which they occupy during operational conditions of the aircraft and open dispositions which they take up to provide access to engine components. The upper and lower nacelle portions are so mounted as to be displaceable to their open and closed dispositions in movements in which one is assisted by gravitational force and the other is displaced against gravitational force. A force transfer mechanism is provided for transfer during opening and closing movements of the nacelle portions of gravitational force assisting displacement of one of the nacelle portions to assist in displacement of the other nacelle portion being displaced against gravitational force.

1 Claim, 7 Drawing Sheets

AIRCRAFT PROPULSIVE POWER UNIT

The present invention relates to aircraft propulsive power units including an engine and a nacelle structure which houses the engine.

Turbofan propulsive power units which are outboard mounted on support structures on the aircraft typically include thrust reverser cowls and fan cowl doors, both of which are pivotally mounted on the support structure and give access to the core and fan sections of the engine by pivotal opening movements.

In an underwing mounted configuration, the support structure depends from the underside of the wing. Left hand and right hand reverser cowls and fan cowl doors are provided which are pivotally mounted on the depending support structure and which extend in arcuate form round opposite sides of the nacelle structure to attachment positions at the underside of the nacelle structure.

In a fuselage mounted configuration, the support structure extends outwardly from a rear fuselage location and upper and lower reverser cowls and fan cowl doors are provided which are pivotally mounted on the outstanding support structure and which extend in arcuate form round the nacelle structure from the side of the nacelle structure at which the reverser cowls and fan cowl doors are pivotally mounted to attachment positions at the opposite side of the nacelle structure.

Depending on engine size, the reverser cowls can become large and heavy, to the point where an operator cannot safely handle them or even physically move them. A typical solution to this problem is to incorporate a powered cowl opening system into the design. The source of power can vary (hydraulic, electric or even pneumatic) but in general the system has a number of actuators that open the reverser cowls to the required position, and close the cowls when required.

Such systems are heavy and costly. They also tend not to be very user-friendly as power generating equipment needs to be provided and connected every time the reverser cowls are to be opened or closed. This requires additional time and also for the equipment to be available and working.

An object of the present invention is to provide an alternative means to facilitate and control the opening and closing of thrust reverser cowls for fuselage mounted configurations in which the nacelle structure is provided with upper and lower reverser cowls.

A further object of the present invention is to provide means to facilitate and control the opening and closing of fan cowl doors for fuselage mounted configurations in which the nacelle structure is provided with upper and lower fan cowl doors.

A still further object of the present invention is to provide means to facilitate and control the opening and closing of thrust reverser cowls and fan cowl doors for fuselage mounted configurations in which the nacelle structure is provided with an upper thrust reverser cowl and an upper fan cowl door and a lower thrust reverser cowl and a lower fan cowl door.

According to the present invention there is provided an aircraft having a propulsive power unit including an engine and a nacelle structure housing the engine, the nacelle structure including first and second displaceable nacelle portions each of which is displaceable between a closed disposition which it occupies during operational conditions of the aircraft and an open disposition which it takes up to provide access to engine components, the first and second nacelle portions being so mounted that the first nacelle portion is displaceable to its open disposition in an opening movement in which it is assisted by gravitational force acting upon it and is displaceable to its closed disposition in a closing movement against gravitational force acting on it and the second nacelle portion is displaceable to its open disposition in an opening movement against gravitational force acting on it and is displaceable to its closed disposition in a closing movement in which it is assisted by gravitational force acting on it, characterised in that force transfer means provide for a predetermined transfer during opening movements of the nacelle portions of gravitational force acting on the first nacelle portion to assist displacement of the second nacelle portion to its open disposition and during closing movements of the nacelle portions gravitational force acting on the second nacelle portion to assist displacement of the first nacelle portion to its closed disposition.

In each of the embodiments of the invention hereinafter to be described the aircraft comprises propulsive power unit support means to support the aircraft propulsive power unit, a first pivotal mounting on the support means to provide for pivotal opening and closing movements of the first nacelle portion and a second pivotal mounting on the support means to provide for pivotal opening and closing movements of the second nacelle portion. The first nacelle portion is an upper nacelle portion which extends in arcuate form round an upper region of the nacelle structure from its pivotal mounting on the support means at one side of the nacelle structure to an attachment position at the other side of the nacelle structure and the second nacelle portion is a lower nacelle portion which extends in arcuate form round a lower region of the nacelle structure from its pivotal mounting on the support means at the one side of the nacelle structure to an attachment position at the other side of the nacelle structure.

In a specific first embodiment of the invention hereinafter to be described the force transfer means comprises a force transfer link mechanism having a pivotal arm which is pivotally connected at one end to one of the nacelle portions at an offset pivotal location which is radially offset from the pivotal mounting of that nacelle portion on the support means and which is pivotally connected at its other end to the other of the nacelle portions at an offset pivotal location radially offset from the pivotal mounting of that nacelle portion on the support means and the disposition of the offset pivotal locations on the nacelle portions and the form of the pivotal arm are such as to cause the predetermined transfer through the pivotal arm of gravitational force during opening and closing movements of the nacelle portions.

In an arrangement according to the specific first embodiment of the invention hereinafter to be described the link mechanism includes a fixed arm fixedly mounted on one of the nacelle portions and extending therefrom, and the offset pivotal location of the pivotal arm on that nacelle portion is provided on the fixed arm at the end thereof. The pivotal arm further includes adjustment means to adjust the length of the arm.

In an alternative arrangement according to the specific first embodiment of the invention hereinafter to be described the link mechanism is a first link mechanism with the fixed arm mounted on the upper nacelle portion and the force transfer means includes a second link mechanism of the same form as the first link mechanism with its fixed arm fixedly mounted on the lower nacelle portion. The first and second link mechanisms are of identical form and share the predetermined transfer of gravitational force during the opening and closing movements of the nacelle portions.

In a specific second embodiment of the invention hereinafter to be described the force transfer means comprises a force transfer gear mechanism including a first gear segment having an arcuate toothed track with a centre of curvature at the pivotal mounting of the upper nacelle portion on the support means and a second gear segment having an arcuate toothed track with a centre of curvature at the pivotal mounting of the lower nacelle portion on the support means, and the gear segments are so positioned on the nacelle portions as to maintain the toothed tracks in driving engagement with each other, thereby to cause the predetermined transfer of gravitational force during opening and closing movements of the nacelle portions.

In a specific third embodiment of the invention hereinafter to be described the force transfer means is a force transfer fluid responsive mechanism comprising first and second fluid responsive components; the first component is pivotally connected at one end to the upper nacelle portion at an offset pivotal location which is radially offset from the pivotal mounting of that nacelle portion on the support means and at the other end is pivotally connected to the support means at an offset pivotal mounting offset from the pivotal mounting of that nacelle portion on the support means and the second component is pivotally connected at one end to the lower nacelle portion at an offset pivotal location which is radially offset from the pivotal mounting of that nacelle portion on the support means and at the other end is pivotally connected to the support means at an offset pivotal mounting radially offset from the pivotal mounting of that nacelle portion on the support means; each component is responsive to flow of fluid applied to it; fluid flow connections are provided between the components to provide for fluid flow to and from them; and the dispositions of the pivotal connections of the two components, the fluid response characteristics of the two components and the fluid flow connections between them are such as to cause the predetermined transfer of gravitational force imposed on one nacelle portion to the other nacelle portion during opening and closing movements of the nacelle portions.

In an arrangement according to the specific third embodiment of the invention each fluid responsive component comprises a cylinder element and a displaceable piston element displaceable within the cylinder element and the fluid flow connections provide for fluid flow to and from the cylinder element on each side of the piston element of each component from and to the cylinder element on the other side of the piston element of the other component. Each fluid responsive component is responsive to hydraulic fluid.

In an arrangement according to any of the specific embodiments of the invention hereinafter to be described the upper nacelle portion in its open disposition is such that the upper nacelle portion during its opening movement passes top dead centre in relation to its pivotal mounting on the support means, and biasing means are provided to minimise and optimise the hand load required from an operator during a closing movement in which the upper nacelle portion is required to reach and pass through top dead centre. The biasing means comprises a spring which is pivotally connected at one end to one of the nacelle portions at an offset pivotal location radially offset from the pivotal mounting of that nacelle portion on the support means and which is pivotally connected at its other end at a pivotal location on the other nacelle portion or on the support means.

In an arrangement according to any of the specific embodiments of the invention hereinafter to be described the nacelle structure includes upper and lower thrust reverser cowls pivotally mounted on the support means and the upper and lower nacelle portions are the upper and lower thrust reverser cowls of the nacelle structure.

In an alternative arrangement according to any of the specific embodiments of the invention hereinafter to be described the nacelle structure includes upper and lower fan cowl doors and the upper and lower nacelle portions are the upper and lower fan cowl doors of the nacelle structure.

In yet a further arrangement according to any of the specific embodiments of the invention hereinafter to be described the nacelle structure includes upper and lower thrust reverser cowls pivotally mounted on the support means and upper and lower fan cowl doors pivotally mounted on the support means. The upper reverser cowl and the upper fan cowl door are connectable to each other to form a displaceable upper cowl assembly and the lower reverser cowl and the lower fan cowl door are connectable to form a lower cowl assembly and the upper and lower nacelle portions are the upper and lower cowl assemblies.

In each of the embodiments of the invention hereinafter to be described the support means is in the form of a support boom which is supported at one end by an aircraft part and which extends laterally to support the propulsive power unit outboard of the aircraft part. Furthermore, the aircraft part is a fuselage of the aircraft and the support boom extends outboard of the fuselage at a predetermined dihedral.

Embodiments of the invention will now be described by way of example with reference to the accompanying drawings in which.

Figure 1:
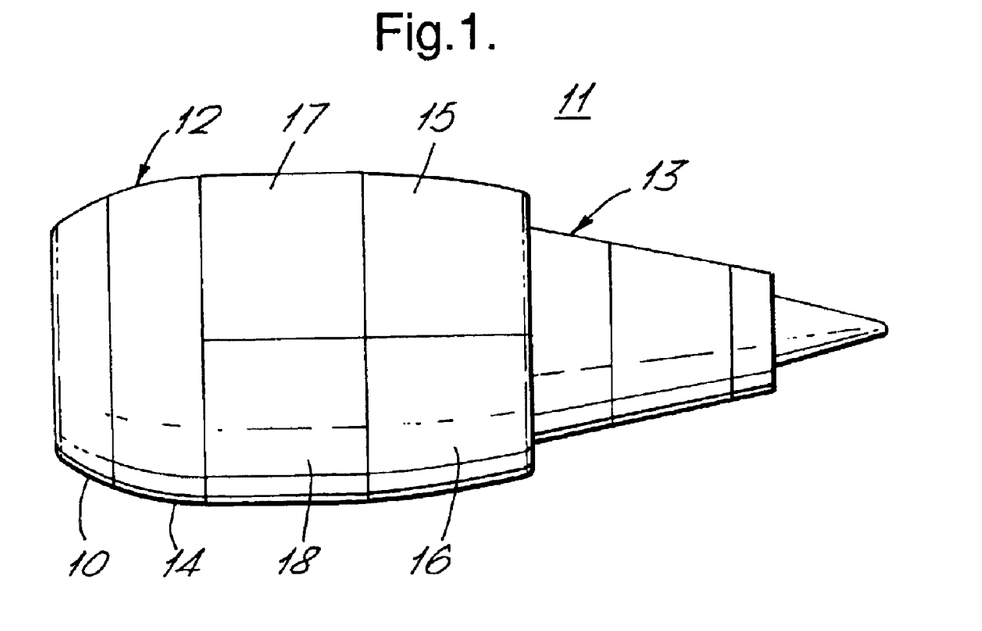
FIG. 1 is a schematic side view of a turbofan aircraft propulsive power unit having a nacelle structure arranged with pivotally mounted reverser cowls and fan cowl doors in a fuselage mounted configuration and viewed from an outboard side of the unit

Referring first to FIG. 1, a turbofan propulsive power unit 11 is shown and comprises a nacelle structure 12 and a gas turbine core engine 13 housed within the nacelle structure 11. The nacelle structure 12 includes a nose cowl portion 10, and a forward fixed cowl portion 14, together with upper and lower thrust reverser cowls 15 and 16 and upper and lower fan cowl doors 17 and 18.

Figure 2:
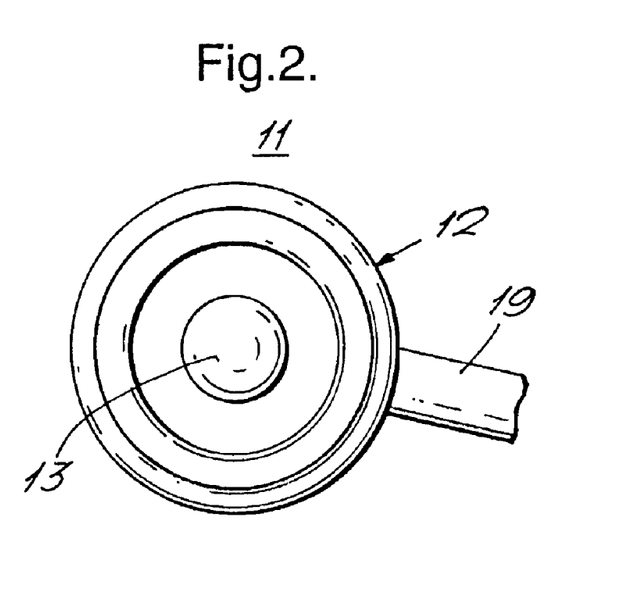
FIG. 2 is a schematic front view of the propulsive power unit shown in FIG. 1 supported by a fuselage mounted boom
Figure 3A:
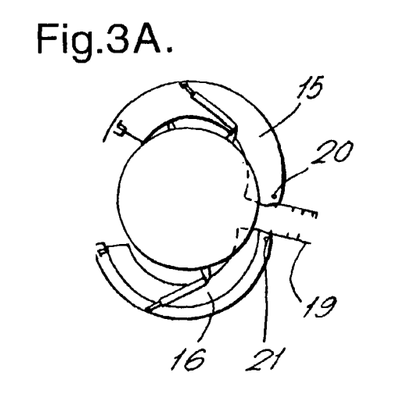
FIG. 3A is a schematic section of part of the power unit shown in FIGS. 1 and 2 with upper and lower thrust reverser cowls at a first progressive stage during an opening movement
Figure 3B:
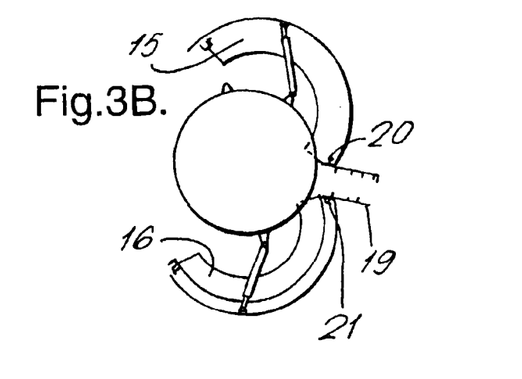
FIG. 3B is a schematic section corresponding to that shown in FIG. 3A with the reverser cowls at a second progressive stage during an opening movement
Figure 3C:
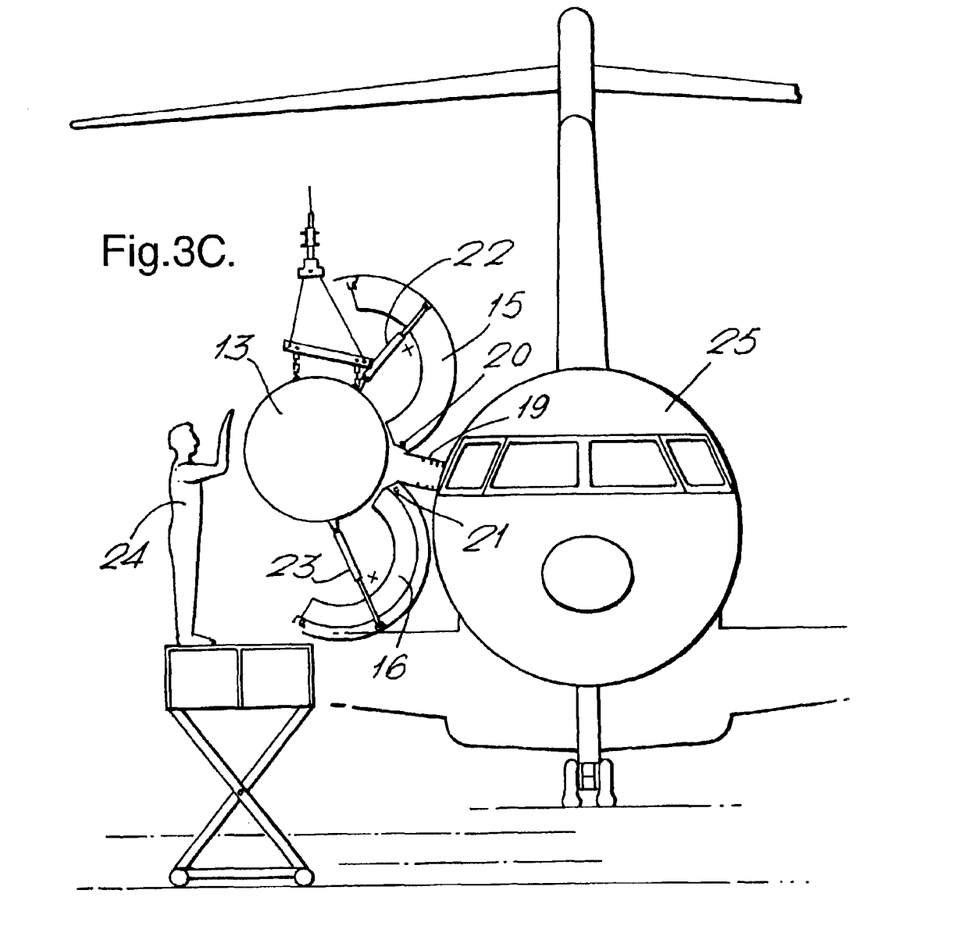
FIG. 3C is a schematic section of the unit illustrated in FIGS. 1 and 2 and shown as fuselage mounted on an aircraft and with the reverser cowls at an open disposition for access

As schematically illustrated in FIGS. 2 and 3C the unit 11 is carried on a support boom 19 outboard of and to the rear of a fuselage 25 of an aircraft.

As illustrated in FIGS. 3A to 3C, pivotal mountings 20 and 21 are carried on the support boom 19 to provide for pivotal opening and closing movements of the upper and lower reverser cowls 15 and 16 which extend in arcuate form round the core engine 13. The cowls 15 and 16 are displaceable between closed dispositions which they occupy during operational conditions of the aircraft and open dispositions which they take up to provide access to engine components.

The reverser cowls 15 and 16 are shown in FIG. 3A to FIG. 3C at progressive stages during an opening movement of the cowls. During the first and second stages shown in FIGS. 3A and 3B the cowl 16 is assisted by gravitational force acting upon it while the upper cowl 15 is displaceable against gravitational force acting on it. A disposition of the cowls 15 and 16 is however reached where the upper cowl 15 passes a top dead centre disposition whereupon further progressive opening of that cowl is assisted by gravitational force acting on it. The two cowls 15 and 16 then take up the fully open disposition shown in FIG. 3C where further opening movement of them is constrained by struts 22 and 23. In this open disposition access to core engine components is provided for maintenance by an operative 24 and for other purposes including removal of the engine 13.

As will be seen from FIG. 3C, the boom 19 is carried by the fuselage 25 and extends therefrom at a small angle to the horizontal plane which gives rise to the upper reverser cowl 15 passing a top dead centre disposition during its movement to the fully open disposition.

Figure 4:
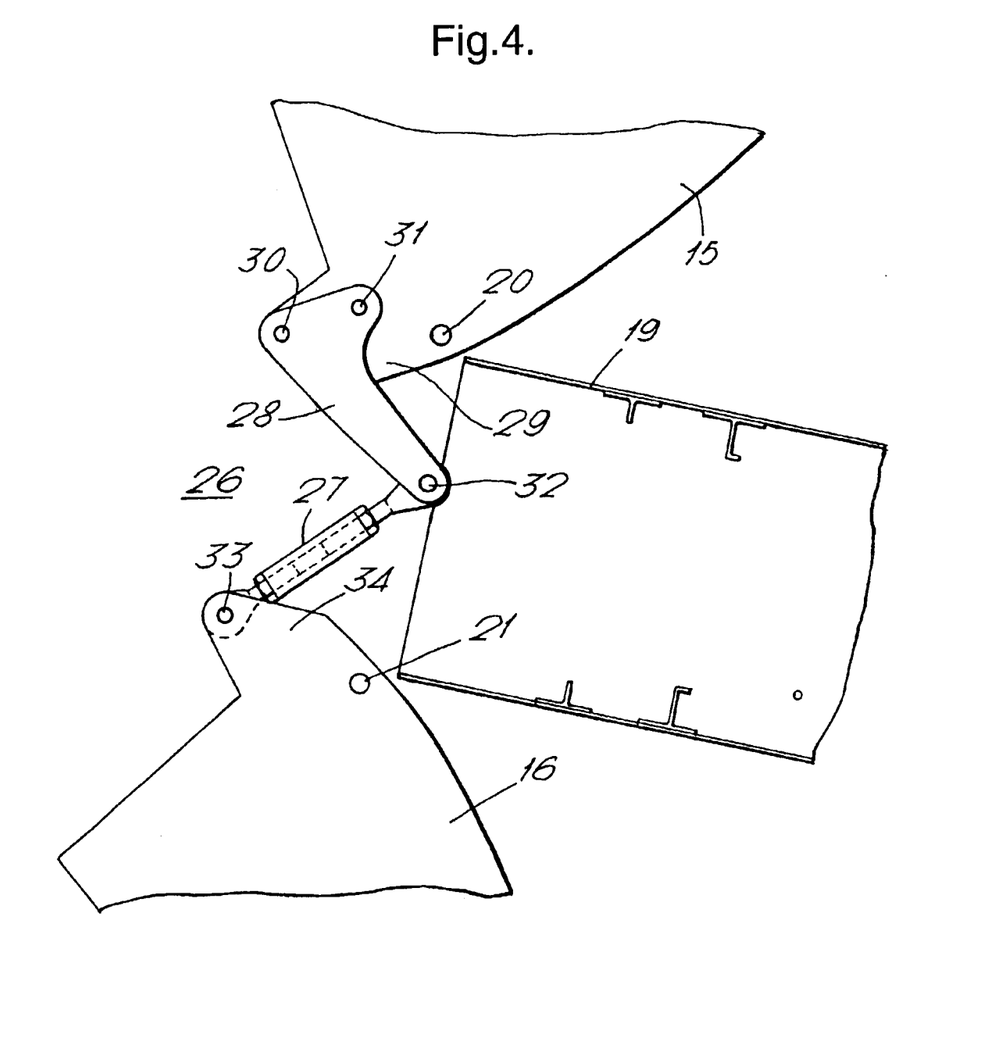
FIG. 4 is a schematic section of the reverser cowls in the open disposition shown in FIG. 3C and illustrating a force transfer link mechanism according to the specific first embodiment of the invention

Referring now to FIG. 4 the reverser cowls 15 and 16 are carried on the support boom 19 on pivotal mountings 20 and 21 and are shown in their fully open dispositions as illustrated in FIG. 3C. A force transfer link mechanism 26 in accordance with the specific first embodiment of the invention comprises a pivotal arm 27 and a fixed arm 28. The fixed arm 28 is carried on spur 29 of the upper reverser cowl 15 and is secured thereto by bolts 30 and 31 so as to extend downwardly as shown to provide a pivotal mounting 32 for one end of the pivotal arm 27, the other end of which is supported by a pivotal mounting 33 provided on a spur 34 of the lower reverser cowl 16.

As will be seen from FIG. 4, the pivotal arm 27 is pivotally connected at one end to the upper cowl 15 at the pivotal mounting 32 which is radially offset from the pivotal mounting 20 of the upper cowl 15 on the support boom 19 and is pivotally connected at its other end to the lower cowl 16 at the pivotal mounting 33 which is radially offset from the pivotal mounting 21 of the lower cowl 16.

The disposition of the pivotal mountings 32 and 33 on the cowls 15 and 16 and the form of the pivotal arm 27 are such as to give rise to transfer during opening movements of the cowls 15 and 16 of gravitational force acting on the cowl 16 to assist displacement of the cowl 15 to its open disposition and during closing movements of the cowls 15 and 16 of gravitational force acting on the upper door 15 to assist displacement of the lower cowl 16 to its closed disposition.

The pivotal link 27 is of adjustable length which allows for the elimination of manufacturing tolerances in the reverser cowl assembly and flexing of the cowl structure due to its own weight. The ability to adjust the link mechanism ensures that the cowls can be properly 'rigged' to seat correctly on to the engine 13.

The design of the link mechanism 26 is such that it is contained within the nacelle structure and requires no interfaces or additional load points on the aircraft, that is to say, it requires support only from the cowls 15 and 16 and the pivotal mountings 20 and 21 and can be regarded as separate from the support boom 19.

Depending on the nature of the power unit installation on the aircraft a specific reverser cowl open angle may be required. The ratio to which the upper and lower cowls open can be varied by an appropriate choice of the ratio of the lengths of the pivotal and fixed arms 27 and 28.

Figure 5:
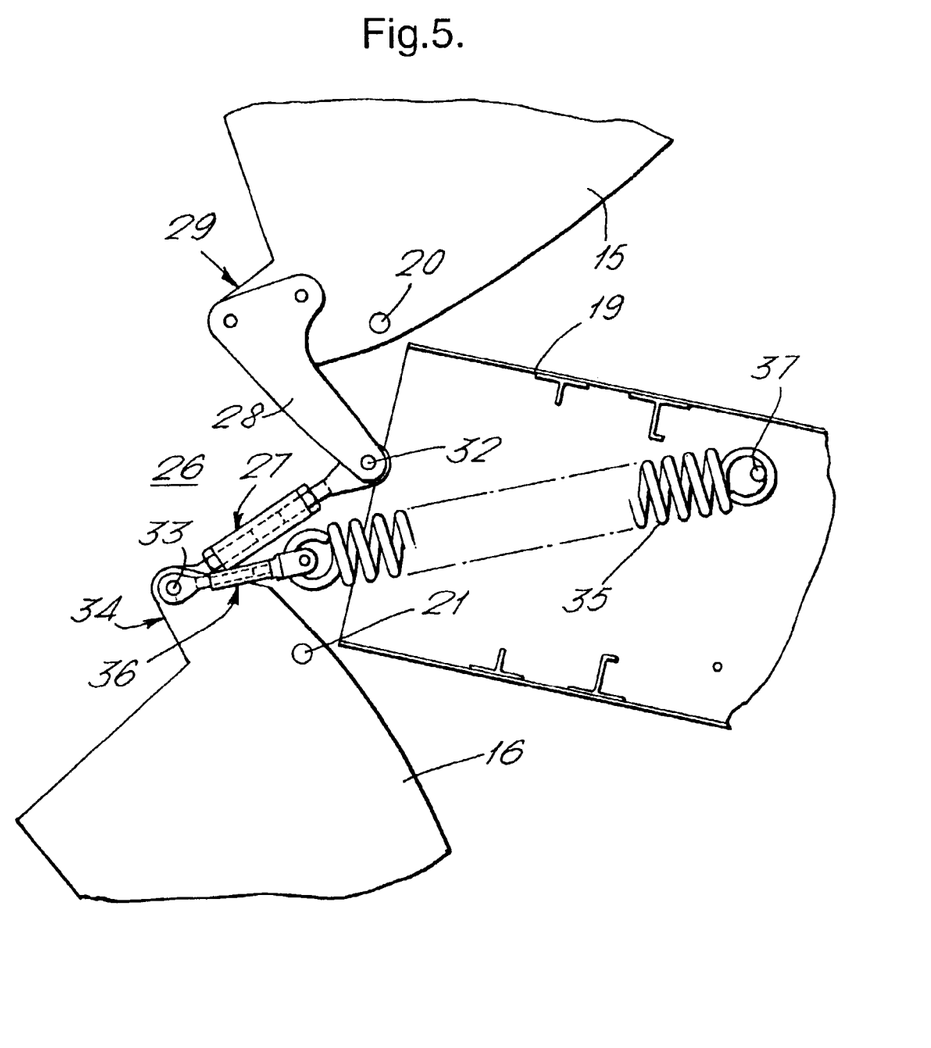
FIG. 5 is a schematic section of the reverser cowls in the open disposition illustrated in FIG. 3C in an alternative arrangement of the specific first embodiment of the invention and including spring biasing means to assist movement past top dead centre of the upper reverser cowl during its closing movement

Referring now to FIG. 5, the upper and lower cowls 15 and 16 and the link mechanism 26 are shown in the same dispositions as those shown in FIG. 4 and the link mechanism 26 is arranged to operate in the same manner as that described with reference to FIG. 4.

As previously stated, the upper reverser cowl 15 during its opening movement passes top dead centre in relation to its pivotal mounting 20 on the support boom 19. To assist the upper reverser cowl 15 to reach top dead centre during its closing movement a spring 35 is pivotally connected at one end through a connecting rod 36 to the pivotal mounting 33 on the spur 34 of the lower cowl 16 and at its other end to a pivotal mounting 37 on the support boom 19. Tension in the spring 35 and the disposition of its pivotal mountings 33 and 37 are such as to assist the upper cowl 15 to reach top dead centre.

While the spring 35 is shown connected to the pivotal mounting 33 on the spur 34 of the cowl 16, it will be appreciated that the spring 35 may be pivotally connected at other locations of the link mechanism 26.

The spring 35 is as shown attached to the pivotal mounting 33 through the connecting rod 36 one end of which is pivotally connected to the pivotal mounting 33 and the other end of which is pivotally secured to the end of the spring 35. The connecting rod 36 is of adjustable length so that the tension in the spring can be varied.

Figure 6:
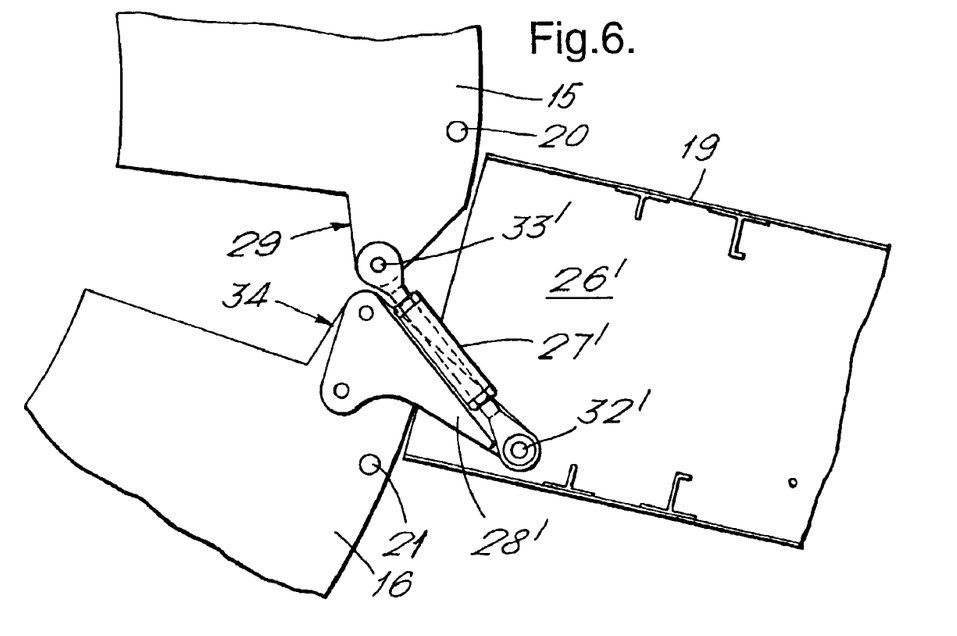
FIG. 6 is a schematic section with the reverser cowls in the closed disposition and illustrating an alternative link mechanism to that shown in FIGS. 4 and 5

Referring now to FIG. 6, the upper and lower reverser cowls 15 and 16 correspond to those shown in FIG. 4. They are pivotally mounted on pivotal mountings 20 and 21 of the support boom 19 and provided with spurs 29 and 34 in the same manner as those shown in FIG. 4. The cowls 15 and 16 are shown in their closed dispositions.

In contrast, however, a force transfer link mechanism 26' replaces the link mechanism 26 shown in FIG. 4 and comprises a pivotal arm 27' and a fixed arm 28' connected together and to the spurs 29 and 34 in an arrangement inverted in relation to mechanism 26 shown in FIG. 4. In particular, the fixed arm 28' is carried on the spur 34 and extends downwardly as shown to provide a pivotal mounting 32' for one end of the pivotal arm 27', the other end of which is supported by a pivotal mounting 33' provided on the spur 29. The pivotal arm 27' is adjustable in length in the same manner as the pivotal arm 27 described with reference to FIG. 4.

The disposition of the pivotal mounting 32' on the cowl 16 and the pivotal mounting 33' on the cowl 15 and the form of the pivotal arm 27' are also such as to give rise to transfer during opening movements of the cowls 15 and 16 of gravitational force acting on the cowl 16 to assist displacement of the upper cowl 15 to its open disposition and during closing movements of the cowls 15 and 16 of gravitational force acting on the upper cowl 15 to assist displacement of the lower cowl 16 to its closed disposition.

The link mechanism 26' has the same design advantages of the link mechanism 26 insofar that it is also contained within the nacelle structure and requires no interfaces or additional load points on the aircraft. Furthermore, the ratio to which the upper and lower reverser cowls open can be varied by an appropriate choice of the ratio of the lengths of the pivotal and fixed arms 27' and 28'.

Figure 7:
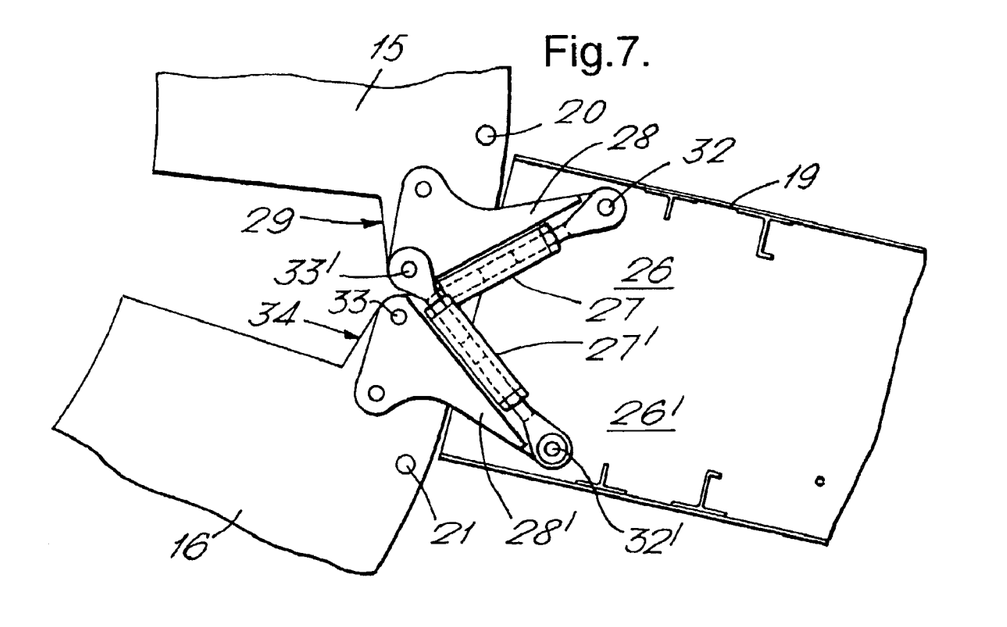
FIG. 7 is a schematic section corresponding to that shown in FIG. 6 with the reverser cowls in the closed disposition and illustrating two link mechanisms one of which corresponds to that shown in FIG. 4 and the other of which corresponds to that shown in FIG. 6

Referring now to FIG. 7, the upper and lower reverser cowls 15 and 16 correspond to those shown in FIG. 6. They are pivotally mounted on pivotal mountings 20 and 21 of the support boom 19 and are provided with spurs 29 and 34 in the same manner as those shown in FIG. 6. The cowls 15 and 16 are shown in their closed dispositions.

In contrast to the link mechanism arrangement described with reference to FIGS. 4 and 6 it will be seen that the spurs 29 and 34 provide support for the link mechanism 26 shown in FIG. 4 and the link mechanism 26' shown in FIG. 6.

The link mechanisms 26 and 26' in the arrangement shown in FIG. 7 are of identical form and share the transfer of gravitational force during the opening and closing movements of the cowls 15 and 16.

The two link mechanisms 26 and 26' shown in FIG. 7 work side by side such that they work in harmony with each other. The mechanisms 26 and 26' are shown installed in opposite orientations in FIG. 7 but may if appropriate be installed with the same orientation. It is also possible to have multiple mechanisms if required depending on practicality and design intent. The link mechanism arrangement shown in FIG. 7 inherits all the benefits of each mechanism.

Figure 8:
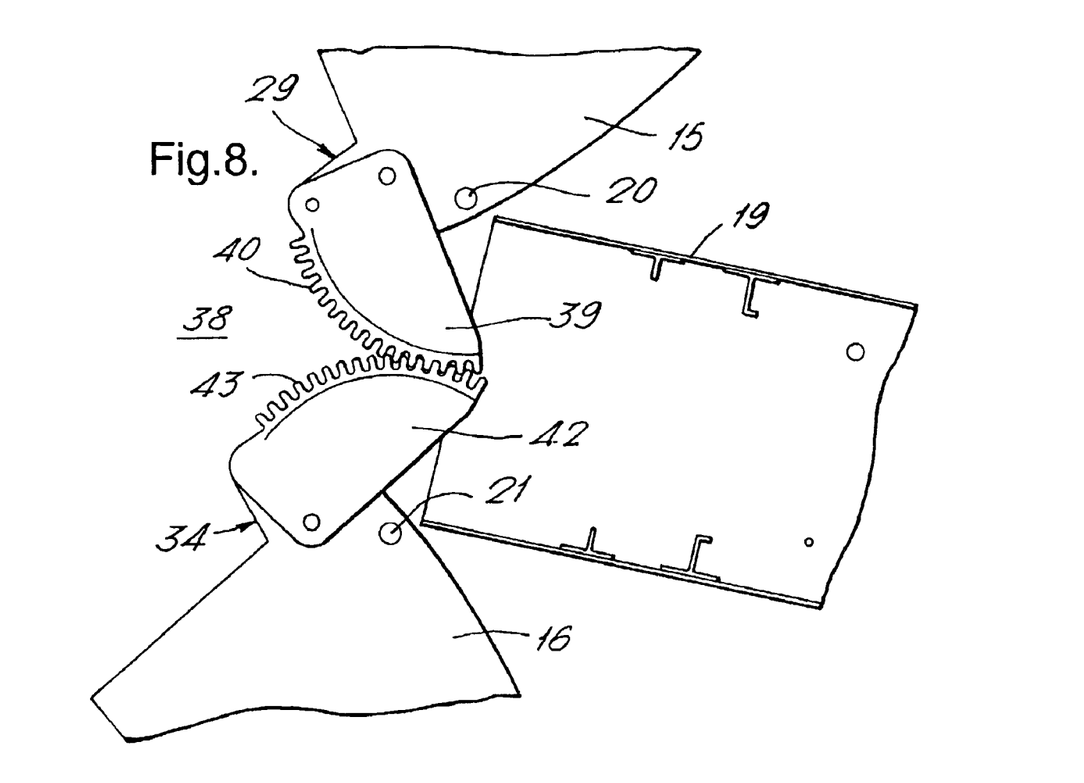
FIG. 8 is a schematic section with the reverser cowls in their open dispositions and illustrating a force transfer gear mechanism in accordance with a specific second embodiment of the invention

Referring now to FIG. 8, the upper and lower reverser cowls 15 and 16 are carried on the support boom 19 on pivotal mountings 20 and 21 and are provided with spurs 29 and 34 as described with reference to FIGS. 4 to 7. The cowls 15 and 16 are shown in their open dispositions. A force transfer gear mechanism 38 in accordance with the specific second embodiment of the invention comprises an upper gear segment 39 fixedly mounted on the spur 29 and having an arcuate toothed track 40 with a centre of curvature at the pivotal mounting 20 and a lower gear segment 42 fixedly mounted on the spur 34 and having an arcuate toothed track 43 with a centre of curvature at the pivotal mounting 21 of the lower cowl 16.

The gear segments 39 and 42 are so positioned on the spurs 29 and 34 as to maintain the teeth on the toothed tracks in driving engagement with each other thereby giving rise to transfer of gravitational force during the opening and closing movements of the cowls 15 and 16.

As will be seen in FIG. 8, with the cowls 15 and 16 in their open dispositions, the gear segments 39 and 42 occupy positions in which their toothed tracks 40 and 43 are at one end of their engagement travel.

Figure 9:
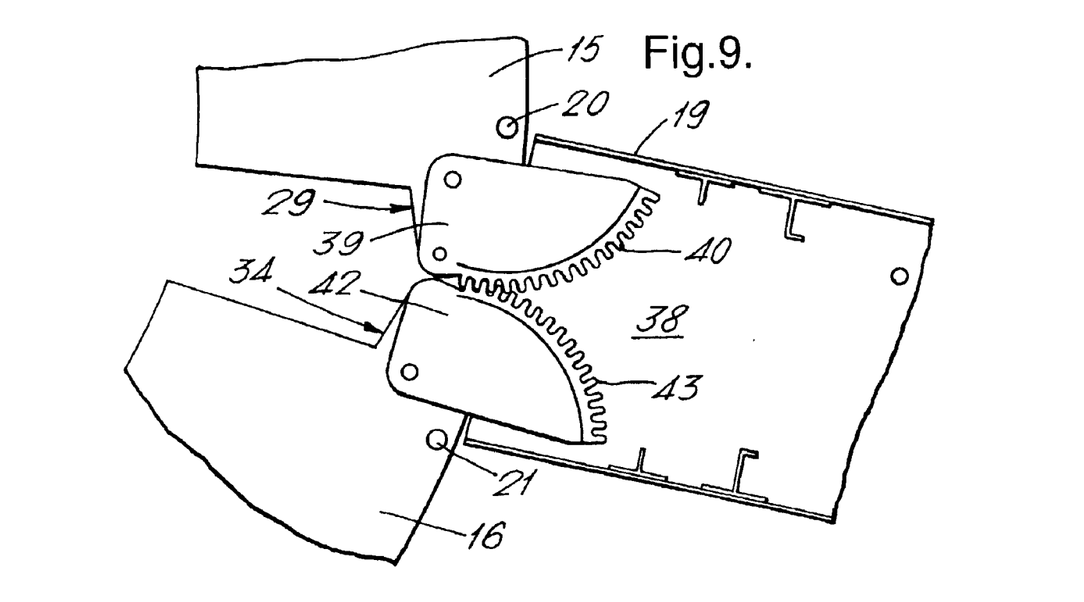
FIG. 9 is a schematic section corresponding to that shown in FIG. 8 with the reverser cowls in the closed disposition.

Referring now to FIG. 9, this figure corresponds to that shown in FIG. 8 except insofar that the upper and lower reverser cowls 15 and 16 are in their closed dispositions with the gear segments 39 and 42 at the other end of their engagement travel.

At least one of the gear segments 39 and 42 is made adjustable such that any backlash in the mechanism, assembly tolerance and/or sag in the cowls 15 and 16 can be eliminated.

The gear mechanism 38 shown in FIGS. 8 and 9 has the same advantage as that of the link mechanism 26 and 26' shown in FIGS. 4 to 8 insofar that it requires support only from the cowls 15 and 16 and the pivotal mountings 20 and 21 and can be regarded as separate from the support boom 19.

Where necessary the gear mechanism 38 can be spring assisted to reduce the required closing force. Also the gear ratio may be varied to change the ratio of the open angles of the cowls 15 and 16 and to vary the level of force required to open and close the cowls.

Figure 10:
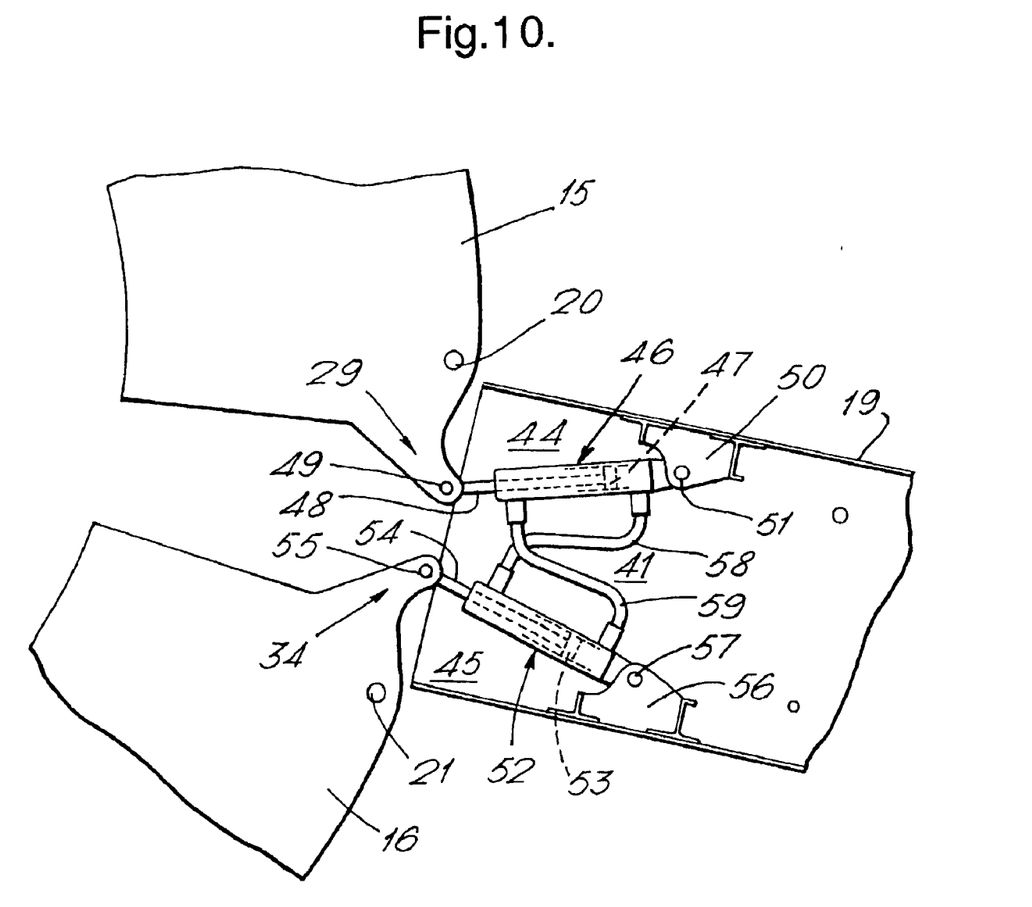
FIG. 10 is a schematic section of the reverser cowls in the closed disposition and illustrating a force transfer fluid responsive mechanism according to a specific third embodiment of the invention.

Referring now to FIG. 10, the cowls 15 and 16 are carried on the support boom 19 on pivotal mountings 20 and 21 and are provided with spurs 29 and 34 as described with reference to FIGS. 4 to 9. The cowls 15 and 16 are shown in their closed dispositions. A force transfer fluid responsive mechanism 41 in accordance with the specific third embodiment of the invention comprises two interacting hydraulic actuators 44 and 45.

The actuator 44 comprises a cylinder element 46 and a piston element including a piston 47 displaceable within the cylinder element 46 and a piston rod 48 which is pivotally connected to a pivotal mounting 49 on the spur 29 carried by the upper cowl 15. The pivotal mounting 49 is as shown radially offset from the pivotal mounting 20 of the cowl 15. The cylinder element 46 is pivotally connected to a bracket 50 on the support boom 19 at a pivotal mounting 51 also radially offset from the pivotal mounting 20 of the cowl 15.

The actuator 45 comprises a cylinder element 52 and a piston element including a piston 53 displaceable within the cylinder element 52 and a piston rod 54 pivotally connected to a pivotal mounting 55 on the spur 34 carried by the lower cowl 16. The pivotal mounting 55 is as shown radially offset from the pivotal mounting 21 of the cowl 16. The cylinder element 52 is pivotally connected to a bracket 56 on the support boom 19 at a pivotal mounting 57 also radially offset from the pivotal mounting 21 of the cowl 16.

To provide for transfer of gravitational force imposed on the cowls 15 and 16 during their opening and closing movements hydraulic fluid lines 58 and 59 are provided which connect the two actuators 44 and 45 in a closed loop configuration. In particular, the fluid line 58 provides for transfer of fluid between the cylinder element 52 to the rear of the piston 53 and the cylinder element 46 to the front of the piston 47. The fluid line 57 likewise provides for transfer of fluid between the cylinder element 46 to the rear of the piston 47 and the cylinder element 52 to the front of the piston 53.

In the operation of the hydraulic actuators 44 and 45, when the cowls 15 and 16, which are shown in the closed dispositions in FIG. 10, commence movement to their open dispositions, the downward movement of the lower cowl 16 about its pivotal mounting 21 assisted by gravitational force causes the piston 53 to extend in the cylinder element 52 and to displace fluid from that cylinder along the fluid line 58 into the cylinder element 46. At the same time fluid to the rear of the piston 47 is displaced along fluid line 59 to the front end of the piston 53 of the actuator 45. In this way gravitational force assisting the opening of the lower cowl 16 is transferred to the upper cowl 15 by the transferred force acting on the piston 47 and assisting in the opening of the upper cowl 15.

The actuators 44 and 45 may be adjusted to ensure that the force required to open the cowls 15 and 16 is kept to a minimum. The hydraulic actuators 44 and 45 may also be used to dampen the speed at which the cowls open. In particular, restrictors may be included in the fluid lines 58 and 59 to provide flow control and damping.

Benefits provided by mechanisms according to the invention and as hereinbefore described are:

(1) The mechanisms by providing for transfer of gravitational force to counterbalance the upper and lower reverser cowls 15 and 16 eliminate the requirement for powered cowl opening mechanisms and are inherently lighter.

(2) The counterbalancing transfer force can be tailored to accommodate various cowl weights and cowl opening angles.

(3) The mechanisms are of simplified design and are more easily maintained than conventional powered systems.

(4) The mechanisms provide fore rapid, user friendly access to the engine and engine accessories and even allow for engine removal and replacement.

(5) Where, as illustrated in FIG. 1 the fan cowl doors 17 and 18 are forward of reverser cowls 15 and 16 and are bolted to the reverser cowls around the aft circumferential edges of the fan cowl doors then they can be arranged to open simultaneously with the reverser cowls, requiring no additional time or effort.

What is claimed is:

1. An aircraft having a propulsive power unit and a propulsive power unit support means to support the aircraft propulsive power unit, the propulsive power unit including an engine and a nacelle structure housing the engine, the nacelle structure including first and second displaceable nacelle portions each of which is displaceable between a closed disposition which it occupies during operational conditions of the aircraft and an open disposition which it takes up to provide access to engine components, the first and second nacelle portions being so mounted that the first nacelle portion is displaceable to its open disposition in an opening movement in which it is assisted by gravitational force acting upon it and is displaceable to its closed disposition in a closing movement against gravitational force acting on it and the second nacelle portion is displaceable to its open disposition in an opening movement against gravitational force acting on it and is displaceable to its closed disposition in a closing movement in which it is assisted by gravitational force acting upon it and is displaceable to its closed disposition in a closing movement against gravitational force acting on it and the second nacelle portion is displaceable to its open disposition in an opening movement against gravitational force acting on it and is displaceable to its closed disposition in a closing movement in which it is assisted by gravitational force acting on it, a first pivotal mounting on the support means to provide for pivotal opening and closing movements of the first nacelle portion, a second pivotal mounting on the support means to provide for pivotal opening and closing movements of the second nacelle portion, and force transfer means provide for a predetermined transfer during opening movements of the nacelle portions of gravitational force acting on the first nacelle portion to assist displacement of the second nacelle portion to its open disposition and during closing movements of the nacelle portions gravitational force acting on the second nacelle portion to assist displacement of the first nacelle portion to its closed disposition, wherein the second nacelle portion in its open disposition is such that the second nacelle portion during its opening movement passes top dead centre in relation to its pivotal mounting on the support means, and wherein biasing means are provided to assist the second nacelle portion to reach top dead centre so as to minimise and optimise the hand load required from an operator during a closing movement in which the second nacelle portion is required to reach and pass through top dead centre;

wherein the biasing means comprises a spring which is pivotally connected at one end to one of the nacelle portions at an offset pivotal location radially offset from the pivotal mounting of that nacelle portion on the support means and which is pivotally connected at its other end at a pivotal location on the other nacelle portion or on the support means.

* * * * *